US012808393B2

(12) United States Patent
Marciniak et al.

(10) Patent No.: US 12,808,393 B2
(45) Date of Patent: Nov. 24, 2026

(54) PNEUMATIC VALVE, PNEUMATIC SYSTEM, AND VEHICLE

(71) Applicant: ZF CV Systems Europe BV, Brussels (BE)

(72) Inventors: Lubomir Marciniak, Wroclaw (PL); Damian Kaszuba, Legnica (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/671,051

(22) Filed: May 22, 2024

(65) Prior Publication Data

US 2024/0392812 A1 Nov. 28, 2024

(30) Foreign Application Priority Data

May 26, 2023 (EP) .................................... 23175644

(51) Int. Cl.
*F15B 15/08* (2006.01)
*F15B 15/14* (2006.01)
*F16K 31/122* (2006.01)

(52) U.S. Cl.
CPC .......... *F15B 15/08* (2013.01); *F15B 15/1428* (2013.01); *F16K 31/122* (2013.01)

(58) Field of Classification Search
CPC .. F15B 15/08; F15B 15/1428; F15B 15/1438; F16K 31/122
See application file for complete search history.

(56) References Cited

FOREIGN PATENT DOCUMENTS

| | | | | | |
|---|---|---|---|---|---|
| CN | 112145676 | A | | 12/2020 | |
| EP | 2698546 | A1 | | 2/2014 | |
| GB | 1287259 | A | * | 8/1972 | ............ F15B 11/123 |
| JP | 2019534983 | A | * | 12/2019 | ............. F16K 17/04 |
| JP | 6824283 | B2 | * | 2/2021 | ........... H01L 21/205 |

* cited by examiner

*Primary Examiner* — Jonathan R Matthias
(74) *Attorney, Agent, or Firm* — Dickinson Wright PLLC

(57) ABSTRACT

A pneumatic valve (100) for a pneumatic system (250) of a vehicle (200*a*) has a cylinder (110) and a main piston (120) arranged within the cylinder (110). The cylinder (110) has an end face (113) with an air distribution channel (130) connected to an air inlet (135) and adapted to deliver pressurized air to move the main piston (120) within the cylinder (110). The air distribution channel (130) delivers air to an inner section (121) and to an outer section (111) being arranged radially outwardly from the inner section (121), and between the main piston (120) and the end face (113). The air distribution channel (130) is adapted to deliver pressurized air to the inner section (121) and to the outer section (111) alternatingly.

20 Claims, 3 Drawing Sheets

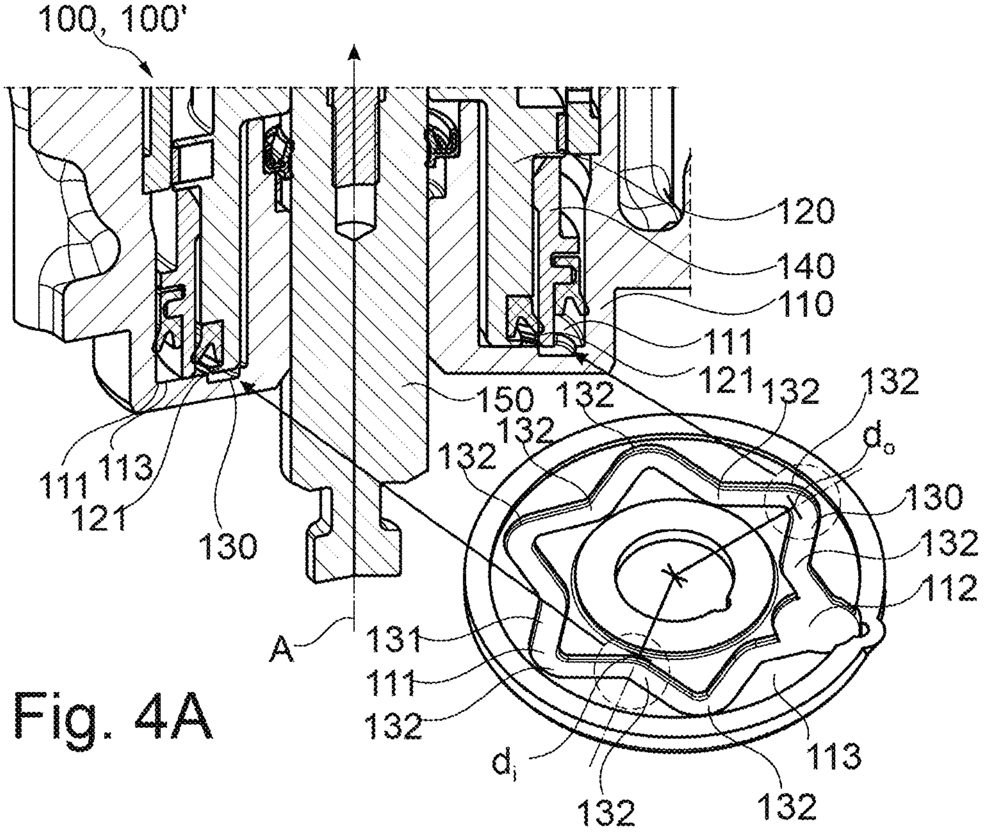
Fig. 4A
Fig. 4B
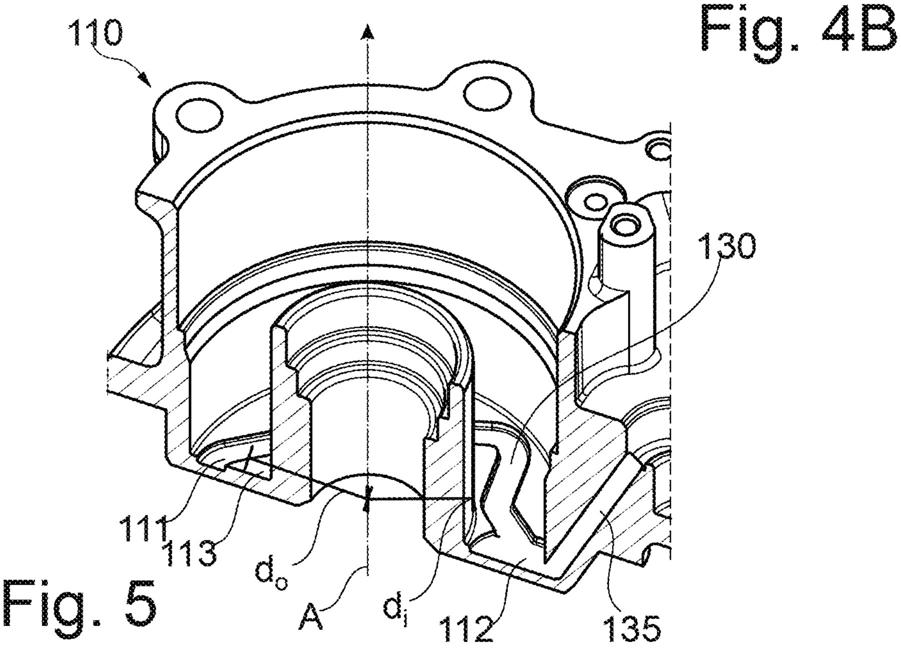
Fig. 5

PNEUMATIC VALVE, PNEUMATIC SYSTEM, AND VEHICLE

FIELD

The disclosure relates to a pneumatic valve for a pneumatic system of a vehicle, in particular a utility vehicle, the pneumatic valve having a cylinder and a main piston arranged within the cylinder. The cylinder has an end face with an air distribution channel connected to an air inlet and adapted to deliver pressurized air to move the main piston within the cylinder. The disclosure further relates to a pneumatic system for a vehicle, in particular a utility vehicle, having a pneumatic valve, and to a vehicle, in particular a utility vehicle, having the pneumatic system.

BACKGROUND

Pneumatic valves are known in the prior art. Pneumatic valves may be controlled by the application of pressurized air. The application of pressurized air may lead to a deflection of one or more pistons. The deflection of the one or more pistons may be reciprocated by a stroke of an actuator. The actuator may actuate a component in a pneumatic system and/or change a state thereof.

When the actuator stroke is beginning from an end position, air needs to be delivered into a space between the piston and the end face of the cylinder. Such an end position may be a position in which a piston is too close to and/or even contacting the end face of the cylinder, e.g., a fully extended position, or, if the valve includes an auxiliary piston, a partly extended position at which the main piston contacts the end face. This may cause, upon the application of pressurized air, a non-uniform air distribution between the piston and the end face. The non-uniform air distribution may result in uneven force acting on the piston for deflecting the piston at the very beginning of the stroke of the actuator. This may cause sideways loads, i.e., forces between a lateral face of the piston and a lateral face of the cylinder, resulting in increased friction between the piston and the cylinder. In consequence, the non-uniform air distribution may lead to a delayed reaction of the actuator and/or to an improvable performance.

To avoid the above, it is known from the prior art to provide a volume between the piston and the cylinder bottom, even in an end stop position of the actuator and/or of the piston. However, the so-called dead volume slows down the actuator reaction to pressure input, because pressurized air fills the dead volume and then deflects to the piston. As a result, there is usually a design compromise to leave as little dead volume as possible but still enough volume between the piston and the end face to ensure a proper air distribution.

The above is even more pronounced for pneumatic valves known as three-position actuators. Such a three-position actuator usually includes one or more auxiliary pistons which increase the complexity of the valve and the vulnerability to an uneven air distribution that may cause tilting or other misbehaviors.

SUMMARY

The object of the disclosure is to provide a technological contribution to the art. An embodiment of the present disclosure may solve the problems described above by enabling an even air distribution between a piston and an end face of a pneumatic valve, while avoiding introducing a large amount of dead volume between the piston and the end face.

The problems are solved as described herein.

According to an aspect of the disclosure, a pneumatic valve for a pneumatic system of a vehicle, in particular utility vehicle, is provided. Therein, the pneumatic valve includes a cylinder and a main piston arranged within the cylinder, the cylinder has an end face with an air distribution channel connected to an air inlet and adapted to deliver pressurized air to move the main piston within the cylinder, and the air distribution channel is adapted to deliver pressurized air to an inner section and to an outer section arranged radially outwardly from the inner section, and also between the main piston and the end face, wherein the air distribution channel is adapted to deliver pressurized air to the inner section and to the outer section alternatingly.

The piston may be adapted to be deflected, i.e., to move along an axis, within the cylinder under the application of the pressurized air. The axis may be defined as a respective cylinder axis of the cylinder and/or the piston. The arrangement of the inner section and of the outer section may be, in a radial direction, defined by the axis. I.e., the inner section may be arranged between the axis and the outer section. In the axial direction, the inner section and the outer section are arranged extending between the main piston and the end face. This provides that, in an end stop position, pressurized air may be delivered between the main piston and the end face to deflect the main piston.

When pressurized air is applied, the air distribution channel may be considered as a route of least resistance for the pressurized air. Thus, pressurized air may be distributed within the air distribution channel upon the application of the pressurized air. The air distribution channel is decisive for the onset of the deflection of the main piston. The alternating air distribution channel may provide uniform air distribution underneath the piston of the pneumatic actuator, i.e., between the end face and the piston, at the beginning of the stroke starting from an end position, even if the cylinder bottom acts as a hard end stop.

To provide as little dead volume as possible and achieve an even distribution of pressurized air, the air distribution channel is adapted to deliver pressurized air to the inner section and to the outer section alternatingly. The alternating delivery of pressurized air to the inner section and to the outer section is in contrast to an air distribution channel that delivers pressurized air to a connected and circumferential volume between the main piston and the end face which spans along its circumference from an inner diameter to an outer diameter. This use of the inner and outer sections reduces the volume of the air distribution channel and may thus improve the performance of the pneumatic valve.

Optionally, the air distribution channel is alternatingly arranged between an inner diameter and an outer diameter of the cylinder. Thus, the air distribution channel is adapted to deliver pressurized air to the inner diameter and to the outer diameter alternatingly. I.e., along a contour of the air distribution channel, the air distribution channel extends to the inner diameter but not to the outer diameter, then to the outer diameter but not to the inner diameter, and so forth. This arrangement may reduce the dead volume compared to an air distribution channel extending between the inner and the outer diameter along a circumference, i.e., the contour of the air distribution channel.

Optionally, the air distribution channel comprises a zig-zag-shaped, a meandering, and/or undulated contour. Each of the zig-zag-shaped, the meandering, and/or the undulated contour may enable the air distribution channel to deliver pressurized air to the inner section and to the outer section alternatingly. This achieves a proper air distribution while avoiding unnecessary dead volume. Therein, the zig-zag-shaped, the meandering, and/or the undulated contour may define a radial extension and/or arrangement of the air distribution channel in dependence on a circumferential coordinate.

Optionally, the cylinder defines an axis and the air distribution channel is partially or entirely circumferentially arranged at the end face. A circumferential arrangement of the air distribution channel achieves a homogeneous application of pressurized air. However, this may also be essentially achieved with a partial circumferential arrangement of the air distribution channel. The partial circumferential arrangement may result from ribs being arranged at the end face which may, e.g., project into the channel. Such ribs could improve the manufacture of the cylinder but may not be necessary for the functioning of air distribution channel.

Optionally, the air distribution channel includes a plurality of delivery sections, and the air distribution channel is adapted to deliver pressurized air to each of the inner section and to the outer section at one of the plurality of delivery sections. Therein, the air distribution channel includes dedicated delivery section to apply pressurized air. The delivery section may be defined by radially inner sections of the air distribution channel to deliver pressurized air to the inner sections and radially outer sections of the air distribution channel to deliver pressurized air to the outer sections.

Optionally, the pneumatic valve includes an auxiliary piston being arranged radially outwardly from the main piston, and the outer section is adapted to deliver pressurized air to the auxiliary piston. In particular, the outer section may be adapted to deliver pressurized air between the auxiliary piston and the end face. This may be an efficient embodiment of pneumatic valve with the plurality of pistons, wherein homogeneous distribution of air is provided. For the same reason, optionally, the pneumatic valve is a three-position actuator.

Optionally, the end face includes a connecting portion adapted to interconnect the air distribution channel and the air inlet, and the connecting portion comprises a larger radial extension than the air distribution channel. The connecting portion may enable a more efficient manufacturing, e.g., by milling. For this reason, the connecting portion may be convex and curved, e.g., round and/or oval. The cross-section of the air distribution channel may differ from the cross-section and/or shape of the connecting portion. E.g., the cross-section of the air distribution channel may be U-shaped and/or V-shaped.

According to an aspect of the disclosure, a pneumatic system for a vehicle, in particular a utility vehicle, is provided. The pneumatic system includes the pneumatic valve as described above. Optionally, the pneumatic valve includes one or more of the above-described optional features to achieve a corresponding technical effect.

Optionally, the pneumatic system is an automated manual transmission. This may be a particular useful application for such a valve. The automated manual transmission may advantageously benefit from the improved performance of the pneumatic valve. In other embodiments, the pneumatic valve may be used in other pneumatic systems, such as a pneumatic suspension system, and/or a pneumatic braking system.

According to an aspect of the disclosure, a vehicle, in particular a utility vehicle, is provided. The vehicle, in particular a utility vehicle, includes the pneumatic system as described above. Optionally, the pneumatic system and/or the pneumatic valve of the pneumatic system includes one or more of the above-described optional features to achieve a corresponding technical effect.

Further technical features and their technical effects are disclosed in the figures and the description thereof.

BRIEF DESCRIPTION OF THE DRAWINGS

The figures illustrates example embodiments of the present disclosure, as follows:

FIG. 4A is a sectional view of details of a pneumatic valve according to an embodiment of the disclosure;

FIG. 4B is a perspective view of details of a pneumatic valve according to an embodiment of the disclosure; and FIG. 5 is a cross-sectional view of details of a cylinder of a pneumatic valve according to an embodiment of the disclosure.

DETAILED DESCRIPTION

Figure 1:
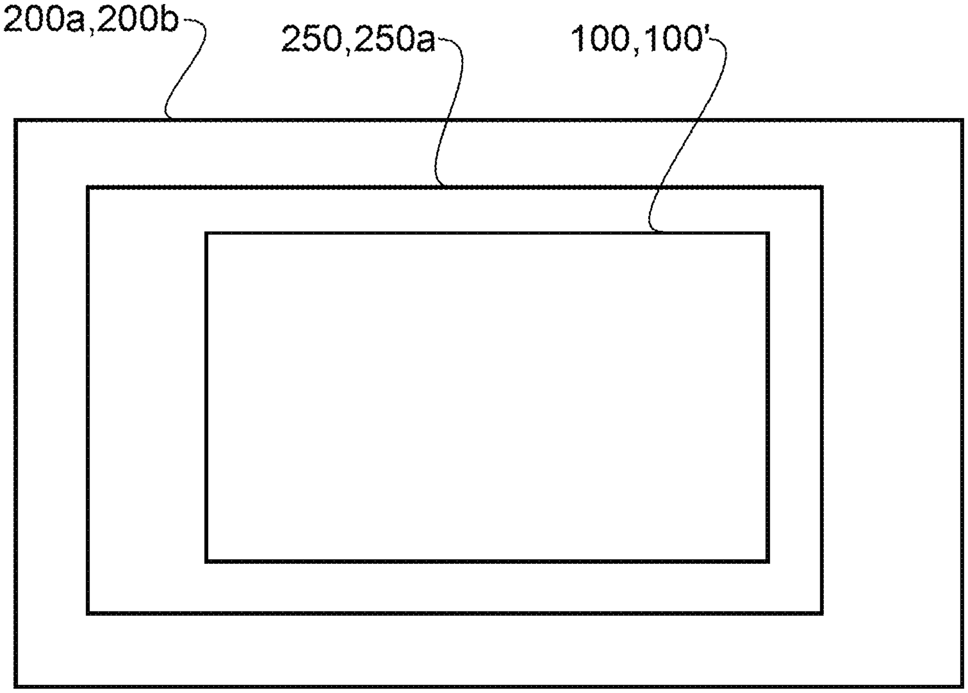
FIG. 1 is a schematic of a vehicle, in particular utility vehicle, according to an embodiment of the disclosure.

FIG. 1 shows a schematic of a vehicle 200*a*, in particular a utility vehicle 200*b*, according to an embodiment of the disclosure. In the following, the vehicle 200*a*, in particular a utility vehicle 200*b*, is referred to as vehicle 200*a*, 200*b*. The vehicle 200*a*, 200*b* is a land-vehicle. The vehicle 200*a*, 200*b* may be a truck, a bus and/or a trailer.

The vehicle 200*a*, 200*b* includes a pneumatic system 250. The pneumatic system 250 is an automated manual transmission 250*a*. The automated manual transmission 250*a* is adapted to switch gears, e.g., of an electric drive integrated into one of a plurality of axles (not shown), so called e-axles, of the vehicle 200*a*, 200*b*.

The pneumatic system 250 includes a pneumatic valve 100. The pneumatic system 250 is adapted to supply pressurized air to the pneumatic valve 100. The pneumatic valve 100 is a three-position actuator 100'.

The pneumatic valve 100 is further described with reference to FIGS. 4 and 5.

Figure 2:
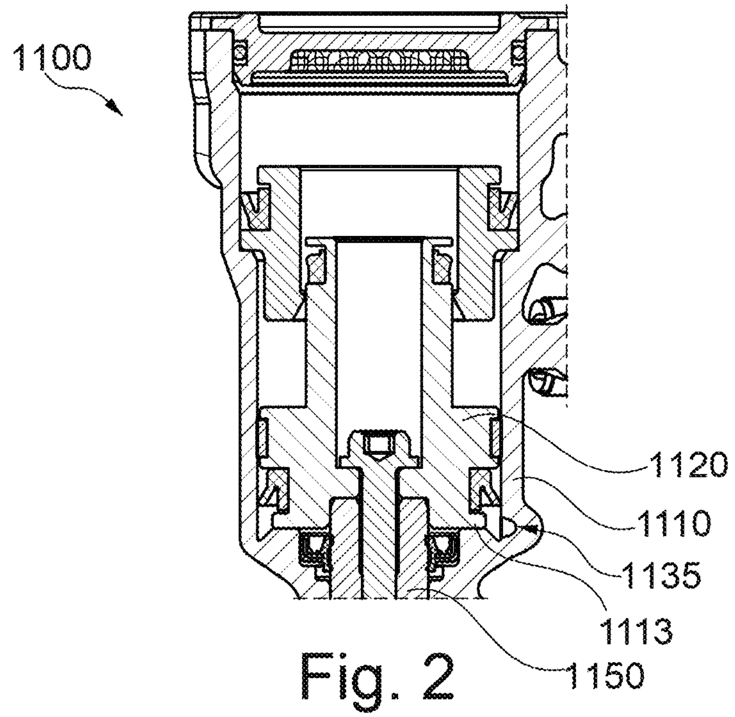
FIG. 2 is a cross-sectional view of a pneumatic valve.

FIG. 2 shows a cross-sectional view of a pneumatic valve 1100.

The pneumatic valve 1100 includes a cylinder 1110 and a movable piston 1120 within the cylinder 1110. The motion of the piston 1120 may cause a stroke of an actuator 1150. To move the piston 1120, the pneumatic valve 1100 includes an air inlet 1135 via which pressurized air may be applied.

The cylinder 1110 includes an end face 1113. The air inlet 1135 is arranged at the end face 1135 so that pressurized air may be delivered between the end face 1135 and the piston 1120 to deflect the piston 1120.

The valve 1100 is illustrated in the extended position. I.e., the piston 1120 is arranged at an end stop and the actuator 1150 is extended, i.e., projects maximally from the cylinder 1110. The actuator 1150 may be retracted when pressurized air is supplied and the piston 1120 is deflected.

In the end stop position, the piston 1120 contacts the end face 1113. Pressurized air may non-homogeneously and non-uniformly distribute between the end face 1113 and the main piston 1120 which leads to risk of sticking and/or increased friction between the piston 1120 and the cylinder 1110.

Figure 3A:
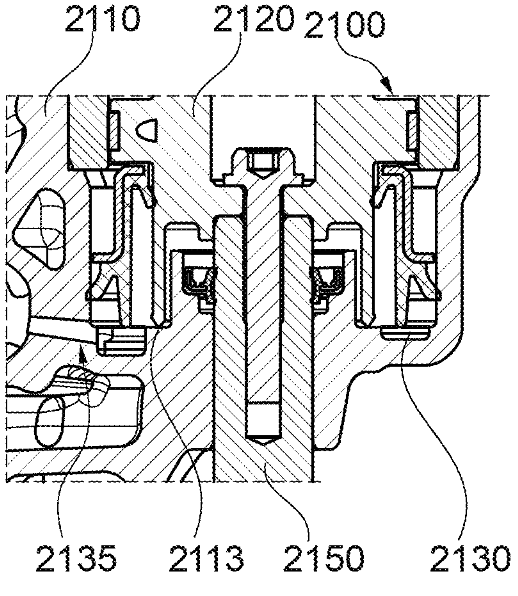
FIG. 3A is a detailed cross-sectional view of the pneumatic valve.
Figure 3B:
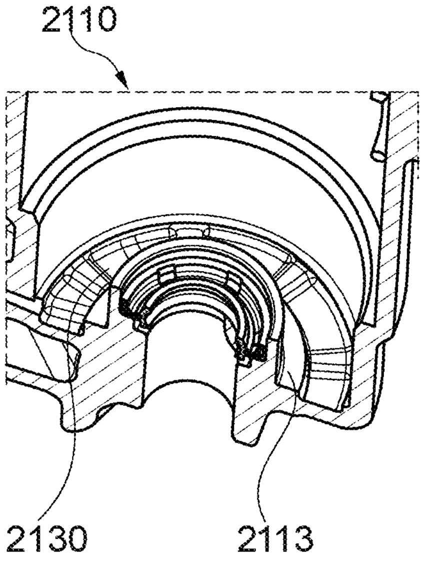
FIG. 3B is a perspective sectional view of a cylinder of a pneumatic valve.

FIGS. 3A and 3B show cross-sectional views of a pneumatic valve 2100 and a perspective sectional view of a cylinder 2110 of pneumatic valve 2100. Therein, FIG. 3A shows the cross-sectional view of the pneumatic valve 2100 and FIG. 3B shows the perspective sectional view of the cylinder 2110 of the pneumatic valve 2100, i.e., in FIG. 3B the piston 2120 is schematically removed for clearer illustration.

As shown in FIG. 3A, the pneumatic valve 2100 includes a cylinder 2110 and a movable piston 2120 within the cylinder 2110. The motion of the piston 2120 may cause a stroke of an actuator 2150. To move the piston 2120, the pneumatic valve 2100 includes an air inlet 2135 via which pressurized air may be applied.

The cylinder 2110 includes an end face 2113. The air inlet 2135 is arranged at the end face 2113 so that pressurized air may be delivered between the end face 2113 and the piston 120 to deflect the piston 120.

The valve 2100 is illustrated in the extended position. I.e., the piston 2120 is arranged at an end stop and the actuator 2150 is extended, i.e., projects maximally from the cylinder 2110. The actuator 2150 may be retracted when pressurized air is supplied and the piston 2120 is deflected.

The cylinder 2110 includes an air distribution channel 2130. The air distribution channel 2130 is arranged at the end face 2113. The air inlet 2135 is adapted to deliver pressurized air in the air distribution channel 2130.

As illustrated in FIG. 3B, the air distribution channel 2130 is circumferentially arranged at the end face of the cylinder 2110. The air distribution channel 2130 extends from an inner diameter to an outer diameter so that a connected and circumferential volume between the piston 2120 and the end face 2113 which spans along its circumference from the inner diameter to the outer diameter is provided. The simple air distribution channel 2130 leads to a comparatively large dead volume, i.e., the volume of the air distribution channel 2130, which may impede the performance of the valve 2100 relative to valve 100 described below.

FIGS. 4A and 4B show a sectional view and a perspective view of details of a pneumatic valve 100 according to an embodiment of the disclosure. The pneumatic valve 100 is a pneumatic valve 100 for a pneumatic system 250 of a vehicle 200*a*, 200*b*. Such a vehicle 200*a*, 200*b* and pneumatic system 250 is described with reference to FIG. 1. FIG. 4 is described under reference to FIG. 1. Therein, FIG. 4A shows the sectional view of the pneumatic valve 100 and FIG. 4B shows perspective view of details of a pneumatic valve 100, in particular of an end face 113 and an air distribution channel 130. The relation between FIGS. 4A and 4B is schematically indicated by two arrows between FIGS. 4A and 4B.

In FIG. 4A, the pneumatic valve 100 is a three-position actuator 100'. I.e., the pneumatic valve 100 comprises an actuator 150, e.g., a push rod, which may be deflected in one of three positions by the application of pressurized air.

The pneumatic valve 100 comprises a cylinder 110. The cylinder 110 is also referred to as a body of the pneumatic valve 100 and/or being comprised by, being, or including the body.

The pneumatic valve 100 includes a main piston 120 and an auxiliary piston 140, each arranged within the cylinder 110. Each of the cylinder 110, the main piston 120 and the auxiliary piston 140 defines an axis A. The auxiliary piston 140 is arranged radially outwardly from the main piston 120.

Each of the main piston 120 and the auxiliary piston 140 is adapted to move in an axial direction along the axis A. The movement of the main piston 120 and the auxiliary piston 140 reciprocates with the deflection of the actuator 150.

The cylinder 110 includes an end face 113 with an air distribution channel 130 being connected to an air inlet 135 (see FIG. 5) and is adapted to deliver pressurized air to move the main piston 120 and/or the auxiliary piston 140 within the cylinder 110.

Within the cylinder 110, an inner section 121 and an outer section 111 is defined. The inner section 121 is radially inwardly arranged from the outer section 111. Each of the inner section 121 and the outer section 111 is arranged, in the axial direction, between the main piston 121 and the end face 113. The air distribution channel 130 is adapted to deliver pressurized air to the inner section 121 and to the outer section 111, see also FIG. 4B.

As shown in FIG. 4B, the air distribution channel 130 is adapted to deliver pressurized air to the inner section 121 and to the outer section 111 alternatingly. The air distribution channel 130 includes a plurality of delivery sections 132, and the air distribution channel 130 is adapted to deliver pressurized air to each of the inner section 121 and to the outer section 111 at one of the plurality of delivery sections 132. I.e., each of the delivery sections 132 is arranged, in radial direction, at the inner section 121 or at the outer section 111.

The cylinder 110 and/or the end face 113 defines a diameter, as a radial extension. In particular, the cylinder 110 defines an inner diameter $d_i$ and an outer diameter $d_o$. The inner diameter $d_i$ coincides, in radial direction, with the arrangement of the main piston 120. The outer diameter $d_o$ coincides, in radial direction, with the arrangement of the auxiliary piston 140. The air distribution channel 130 is alternatingly arranged between the inner diameter $d_i$ and the outer diameter $d_o$ of the cylinder 110.

The air distribution channel 130 has a zig-zag-shaped contour 131. In other embodiments, the air distribution channel 130 has a meandering, i.e., a line with repeated sections, and/or undulated contour 131, e.g., sinusoidal.

In other words, the alternating shape of the air distribution channel 130 may be described as follows: every second one of the delivery sections 132 is arranged at the outer diameter $d_o$ an forms an outer kink of the zig-zagged air distribution channel 130 and is adapted to deliver air via the outer section 111 to the main 120 piston and to the auxiliary piston 140; every other second one of the delivery sections 132 is arranged at the inner diameter $d_i$ and forms an inner kink of the zig-zagged air distribution channel 130 and is adapted to deliver air via the inner section 121 to the main piston 120.

The air distribution channel 130 is circumferentially arranged at the end face 113. In another embodiment, the air distribution channel 130 is partially circumferentially arranged at the end face 113 (such that it does not complete a closed loop)

The air distribution channel 130 forms a groove in the end face 113, i.e., the cylinder bottom wall, and reaches both outer diameters $d_o$ and inner diameters $d_i$. In case of a three-position actuator with the auxiliary piston 140, the outer diameter $d_o$ reaches both the main piston 120 and the auxiliary piston 140. The default shape of the air distribution channel 130 is a “zig-zag” or “star”, but other shapes are possible. The air distribution channel 130 achieves a proper distribution of air underneath the pistons 120, 140 when in the end position while introducing minimal amount of dead volume.

FIG. 5 shows a cross-sectional view of details of a cylinder 110 of a pneumatic valve 100 according to an embodiment of the disclosure. The cylinder 110 as shown in FIG. 5 is the cylinder 110 that is shown in FIG. 4. FIG. 5 is described under reference to FIG. 4.

The cylinder 110 has the end face 113 with the air distribution channel 130 being connected to an air inlet 135 (see FIG. 5) and being adapted to deliver pressurized air to move the main piston 120 and the auxiliary piston 140 within the cylinder 110.

The end face 113 includes a connecting portion 112 adapted to interconnect the air distribution channel 130 and the air inlet 135. The connecting portion 112 has a larger radial extension than the air distribution channel 130. The connecting portion 112 is a section of the end face 113 at which pressurized air is delivered and from which the pressurized air is distributed via the air distribution channel 130. The connecting portion 112 may have a flat base and an oval cross-section.

LIST OF REFERENCE SIGNS (PART OF THE DESCRIPTION)

1100 pneumatic valve
1110 cylinder
1113 end face
1120 main piston
1135 air inlet
1150 actuator
2100 pneumatic valve
2110 cylinder
2113 end face
2120 main piston
2130 air distribution channel
2135 air inlet
2150 actuator
100 pneumatic valve
100' three-position actuator
110 cylinder
111 outer section
112 connecting portion
113 end face
120 main piston
121 inner section
130 air distribution channel
131 contour
132 delivery section
135 air inlet
140 auxiliary piston
150 actuator
**200*a*** vehicle
**200*b*** utility vehicle
250 pneumatic system
**250*a*** automated manual transmission
A axis
$d_i$ inner diameter
$d_o$ outer diameter

What is claimed is:

1. A pneumatic valve (100) for a pneumatic system (250) of a vehicle (**200*a*, 200*b***), the pneumatic comprising:
a cylinder (110), and
a main piston (120) arranged within the cylinder (110),
an end face (113) of the cylinder (110) having an air distribution channel (130) connected to an air inlet (135) of the cylinder (110) wherein the air distribution channel (130) delivers pressurized air and moves the main piston (120) within the cylinder (110), and
wherein the air distribution channel (130) delivers pressurized air to an inner section (121) of the air distribution channel (130) and to an outer section (111) of the air distribution channel (130) that is arranged radially outwardly from the inner section (121), and wherein the air distribution channel (130) delivers pressurized air between the main piston (120) and the end face (113), and
wherein the air distribution channel (130) delivers pressurized air to the inner section (121) and to the outer section (111) simultaneously;
wherein the cylinder (110) defines an axis (A) and the air distribution channel (130) is entirely circumferentially arranged around the axis (A) at the end face (113);
wherein the air distribution channel (130) forms a closed loop around the axis (A).

2. The pneumatic valve (100) as claimed in claim 1, wherein the cylinder defines an axis (A), wherein the air distribution channel (130) is alternatingly arranged between an inner diameter ($d_i$) measured from the axis (A) and an outer diameter ($d_o$) measured from the axis (A) that is greater than the inner diameter.

3. A pneumatic valve (100) for a pneumatic system (250) of a vehicle (**200*a*, 200*b***), the pneumatic comprising:
a cylinder (110), and
a main piston (120) arranged within the cylinder (110),
an end face (113) of the cylinder (110) having an air distribution channel (130) connected to an air inlet (135) of the cylinder (110) wherein the air distribution channel (130) delivers pressurized air and moves the main piston (120) within the cylinder (110), and
wherein the air distribution channel (130) delivers pressurized air to an inner section (121) of the air distribution channel (130) and to an outer section (111) of the air distribution channel (130) that is arranged radially outwardly from the inner section (121), and wherein the air distribution channel (130) delivers pressurized air between the main piston (120) and the end face (113), and
wherein the air distribution channel (130) delivers pressurized air to the inner section (121) and to the outer section (111) simultaneously;
wherein the cylinder defines an axis (A);
wherein the air distribution channel (130) extends in an alternating fashion between an inner diameter ($d_i$) measured from the axis (A) and an outer diameter ($d_o$) measured from the axis (A) that is greater than the inner diameter;
wherein the air distribution channel (130) has a zig-zag-shaped, a meandering, and/or undulated contour (131).

4. The pneumatic valve (100) as claimed in claim 3, wherein the cylinder (110) defines an axis (A) and the air distribution channel (130) is partially or entirely circumferentially arranged around the axis (A) at the end face (113).

5. The pneumatic valve (100) as claimed in claim 4, wherein the air distribution channel (130) is entirely circumferentially arranged and forms a closed loop around the axis (A).

6. The pneumatic valve (100) as claimed in claim 3, wherein the air distribution channel (130) includes a plurality of delivery sections (132), wherein the air distribution channel (130) delivers pressurized air to each of the inner section (121) and to each of the outer sections (111) at one of the plurality of delivery sections (132).

7. The pneumatic valve (100) as claimed in claim 6, wherein the delivery sections (132) are connected via connecting sections extending between the inner diameter and the outer diameter, wherein the connecting sections extend transverse to each other in the circumferential direction.

8. The pneumatic valve (100) as claimed in claim 7, wherein the delivery sections (132) disposed at the inner section (121) and inner diameter are defined at an inner corner formed by circumferentially sequential connecting sections, and wherein the delivery sections (132) disposed at the outer section (111) and outer diameter are defined at an outer corner formed by circumferentially sequential connecting sections, such that the air distribution channel (130) alternates between the inner corners and the outer corners.

9. The pneumatic valve (100) as claimed in claim 3, wherein the pneumatic valve (100) includes an auxiliary piston (140) arranged radially outwardly from the main piston (120), and wherein the outer section (111) delivers pressurized air to the auxiliary piston (140).

10. The pneumatic valve (100) as claimed in claim 9, wherein the main piston (120) is arranged at the inner diameter ($d_i$), and the auxiliary piston (140) is arranged at the outer diameter ($d_o$).

11. The pneumatic valve (100) as claimed in claim 10, wherein the inner section (121) of the air distribution channel (130) is disposed at the inner diameter ($d_i$) and the outer section (111) of the air distribution channel (130) is disposed at the outer diameter ($d_o$).

12. The pneumatic valve (100) as claimed in claim 3, wherein the pneumatic valve (100) is a three-position actuator (100').

13. A pneumatic system (250) for a vehicle (200*a*, 200*b*) comprising the pneumatic valve (100) as claimed in claim 3.

14. The pneumatic system (250) as claimed in claim 13, wherein the pneumatic system (250) is an automated manual transmission (250*a*).

15. A vehicle (200*a*, 200*b*) comprising the pneumatic system (250) as claimed in claim 14.

16. The vehicle (200*a*) as claimed in claim 15, wherein the vehicle (200*b*) is a utility vehicle (200*b*).

17. A pneumatic valve (100) for a pneumatic system (250) of a vehicle (200*a*, 200*b*), the pneumatic comprising:

a cylinder (110), and a main piston (120) arranged within the cylinder (110), an end face (113) of the cylinder (110) having an air distribution channel (130) connected to an air inlet (135) of the cylinder (110) wherein the air distribution channel (130) delivers pressurized air and moves the main piston (120) within the cylinder (110), and wherein the air distribution channel (130) delivers pressurized air to an inner section (121) of the air distribution channel (130) and to an outer section (111) of the air distribution channel (130) that is arranged radially outwardly from the inner section (121), and wherein the air distribution channel (130) delivers pressurized air between the main piston (120) and the end face (113), and wherein the air distribution channel (130) delivers pressurized air to the inner section (121) and to the outer section (111) simultaneously;

wherein the end face (113) includes a connecting portion (112) that interconnects the air distribution channel (130) and the air inlet (135), and wherein the connecting portion (112) includes a larger radial extension relative to the air distribution channel (130).

18. The pneumatic valve (100) as claimed in claim 17, wherein the air distribution channel defines a distribution path having a width, wherein an outer profile of the connecting portion (112) is wider the width of the distribution path.

19. The pneumatic valve (100) as claimed in claim 17, wherein the connecting portion (112) and the air distribution channel (130) are each formed in the end face (113) and have a common axial depth extending into the end face (113).

20. The pneumatic valve (100) as claimed in claim 17, wherein the connecting portion (112) is disposed at a first radial and circumferential location radially outward from a central axis of the cylinder (110), wherein the air distribution channel (130) extends away from the connecting portion (112) from a first side of the connecting portion (112) and circumferential around the end face, wherein the air distribution channel (130) and rejoins the connecting portion (112) at a second side opposite the first side.

* * * * *